(12) United States Patent
Setina

(10) Patent No.: US 8,939,335 B2
(45) Date of Patent: Jan. 27, 2015

(54) FIREARM MOUNT FOR VEHICLE TRUNK OR CARGO AREA

(76) Inventor: Terry L. Setina, Olympia, WA (US)

( * ) Notice: Subject to any disclaimer, the term of this patent is extended or adjusted under 35 U.S.C. 154(b) by 210 days.

(21) Appl. No.: 13/467,880

(22) Filed: May 9, 2012

(65) Prior Publication Data

US 2013/0299537 A1 Nov. 14, 2013

(51) Int. Cl.
*B60R 7/14* (2006.01)
(52) U.S. Cl.
USPC ........... 224/281; 224/311; 224/539; 224/564; 224/569; 224/913
(58) Field of Classification Search
CPC ...................................................... B60R 7/14
USPC ......... 224/404, 281, 488, 495, 510, 309, 311, 224/539, 542, 548, 554, 564, 567, 569, 912, 224/913; 211/64
See application file for complete search history.

(56) References Cited

U.S. PATENT DOCUMENTS

| 2,783,896 | A | * | 3/1957 | Agostini et al. | 211/64 |
|---|---|---|---|---|---|
| 4,776,471 | A | * | 10/1988 | Elkins | 211/64 |
| 5,078,279 | A | * | 1/1992 | Hancock et al. | 211/64 |
| 5,438,787 | A | | 8/1995 | McMaster et al. | |
| 5,740,927 | A | * | 4/1998 | Yemini | 211/70.6 |
| 5,762,245 | A | | 6/1998 | Hurst | |
| 5,791,499 | A | * | 8/1998 | Zebbedies | 211/64 |
| 6,546,598 | B1 | * | 4/2003 | Nakanou et al. | 224/281 |
| 6,572,168 | B1 | * | 6/2003 | Radstake | 312/247 |
| 6,626,477 | B2 | | 9/2003 | Maynard et al. | |
| 7,047,771 | B2 | * | 5/2006 | Tanos | 70/16 |
| 2013/0134193 | A1 | * | 5/2013 | Mothersele | 224/281 |
| 2013/0269509 | A1 | * | 10/2013 | Irwin | 89/37.01 |

OTHER PUBLICATIONS

Adamson Industries, "Trunk Vault," http://www.adamsonindustries.com/trunkvault/ (downloaded Apr. 19, 2012).
BLAC-RAC® Manufacturing Inc., "Instruction Manual for BLAC-RAC® Models 1070, 1080E, 1080M, 1090, 1091E and 1090M," http://www.blac-rac.com/downloads/instructions/file/1-blac-rac-installation-instructions.html.
Fleet Safety Equipment, Inc., "Police Gun Rack Universal G5000 by Pro Gard," http://www.fleetsafety.com/Police-Gun-Rack-Universal-G5000-by-Pro-Gard-57 (downloaded Apr. 19, 2012).
M5Board, "RPi's New Shotgun Trunk Mount," http://www.m5board.com/vbulletin/m5-e60-group-buy-forum-sponsor-discussion-offerings/167621-rpis-new-shotgun-trunk-mount.html (downloaded Apr. 19, 2012).
Sirennet, "Turfloc Trunk Mount Gun Rack," http://www.sirennet.com/tltrunk-mount.html (downloaded Apr. 19, 2012).
Troy Products, "AC-CVLTBOX in Ford Crown Victoria," http://www.troyproducts.com/products/Trunk%20Organizers/trunkorganizersFORD.html (downloaded Apr. 19, 2012).
Truck Vault Secure Storage Solutions, "2012 Product Catalog," http://www.truckvault.com/files/catalog/TruckVault_2012_Catalog_ForDownload.pdf (2012).

* cited by examiner

*Primary Examiner* — Justin Larson
(74) *Attorney, Agent, or Firm* — Klarquist Sparkman, LLP

(57) ABSTRACT

A firearm mount for a trunk or cargo space of a vehicle comprises a firearm mount and a support member. The firearm mount is shaped to receive and lockably secure a firearm. The firearm mount is connectable to the support member, and the support member is positionable within the trunk or cargo space to slidably retract inwardly to a storage position and to slidably extend outwardly to an access position. When installed, the firearm mount and the support member are positioned to suspend the firearm within the trunk or cargo for easy access.

11 Claims, 3 Drawing Sheets

FIREARM MOUNT FOR VEHICLE TRUNK OR CARGO AREA

FIELD

This application relates to firearm mounts, and specifically to firearm mounts suitable for use in the trunk or rear cargo area of a vehicle.

BACKGROUND

Providing for secure storage of firearms in vehicles continues to present challenges, especially for law enforcement and tactical personnel. These personnel frequently have a long arm, such as a shot gun or a rifle, on hand in the vehicle, in addition to a personal side arm worn in a holster. The shot gun or rifle is only used occasionally, but nevertheless it must be securely stored at all times yet still be easily accessible to authorized personnel.

Various firearm mounts designed for the passenger compartment of a vehicle are known. For example, some mounts can hold a long arm in an upright position between the driver's and front passenger's seats. The firearm is secured in the mount with a lock to prevent someone who gains access to the front seat area from removing it from the mount, e.g., to use it as a weapon or to steal it.

As standard sedans continue to decrease in size, there is less room to accommodate a standard firearm mount in the typical locations. In addition, it is always desirable to keep firearms out of view from passers by, especially when the officer is out of the vehicle or the vehicle is parked. Firearms can be stored in the trunk area of a sedan to keep them out of view, but this area must provide storage for other types of equipment. So, there may only be room to place the firearm in the trunk, and it may not be protected during transit. In addition, unless the firearm is stored in a particular position, it may not be accessible quickly enough to an officer. Even if quick access to the firearm is provided, security of the firearm needs to provided in situations where the trunk is open but the firearm is not in use.

SUMMARY

Described below are embodiments of a firearm mount that addresses problems in the prior art.

According to one implementation, a firearm mount for a trunk or cargo space of a vehicle comprises a firearm mount and a support member. The firearm mount is shaped to receive and lockably secure a firearm. The support member to which the firearm mount is coupleable is attachable within the trunk or cargo space to slidably retract inward to a storage position and to slidably extend outward to an access position. When installed, the firearm mount and support member are positioned to suspend the firearm within the trunk or cargo space for easy access.

The support member can define an outer side of a trunk tray member. The trunk tray member can comprises a shelf surface configured for positioning at a level above a lowest surface of the trunk.

The firearm mount can be a primary firearm mount configured to receive an intermediate portion of the firearm, and there can be a secondary firearm mount configured to receive an end of the firearm. For example, the secondary firearm mount can be shaped to receive a butt of a shotgun or rifle.

The firearm mount can comprise respective drawer slide assemblies connected to opposite ends of the support member and positionable within the trunk for attachment to trunk surfaces to support the firearm mount above a level of a trunk bottom surface. The firearm mount can comprise respective brackets for mounting the drawer slide assemblies in the trunk. The brackets can be configured for mounting to an underside of a rear deck of the vehicle.

The support member can define a lateral direction, and the firearm mount can be adjustably repositionable in a lateral direction along the support member.

The support member can comprise a T-rail section over a portion of a length of the support member. The firearm mount can have a shaped end and the T-rail can define a channel configured to receive the shaped end.

The support member can define a channel, and the firearm mount can comprise an end shaped to be slidably received within the channel.

According to a method implementation, mounting a firearm mount in a trunk of a vehicle comprises mounting a pair brackets to an underside of a rear deck of the vehicle at spaced apart locations aligned along a lateral axis, positioning a support member parallel to the lateral axis to span the brackets, and coupling a locking firearm mount to the support member such that a firearm can be mounted and locked in a suspended position within the trunk.

The method can also comprise positioning respective drawer slides between the brackets and the support member to allow the support member to be slid perpendicular to the lateral axis between storage and access positions.

Coupling the locking firearm mount to the support member can comprise slidably coupling the locking firearm mount such that a position of the locking firearm mount can be laterally adjusted. Slidably coupling the locking firearm mount can comprise fitting an end of the firearm mount into a channel attached to the support member.

The method can comprise actuating a lock release to unlock the support member to allow the support member to be moved between the storage and access positions.

Mounting a pair of brackets can comprise threading fasteners through apertures in the brackets and into existing holes in the rear deck.

The support member can form the rear of a tray having a support surface for storing equipment. The method can comprise moving the support member between predefined storage and access positions.

In some implementations, when the firearm mount is fully installed in the trunk, the brackets, the support member and the locking firearm mount do not contact a bottom surface of the trunk.

The foregoing features and advantages will become more apparent from the following detailed description, which proceeds with reference to the accompanying figures.

DETAILED DESCRIPTION

Figure 1:
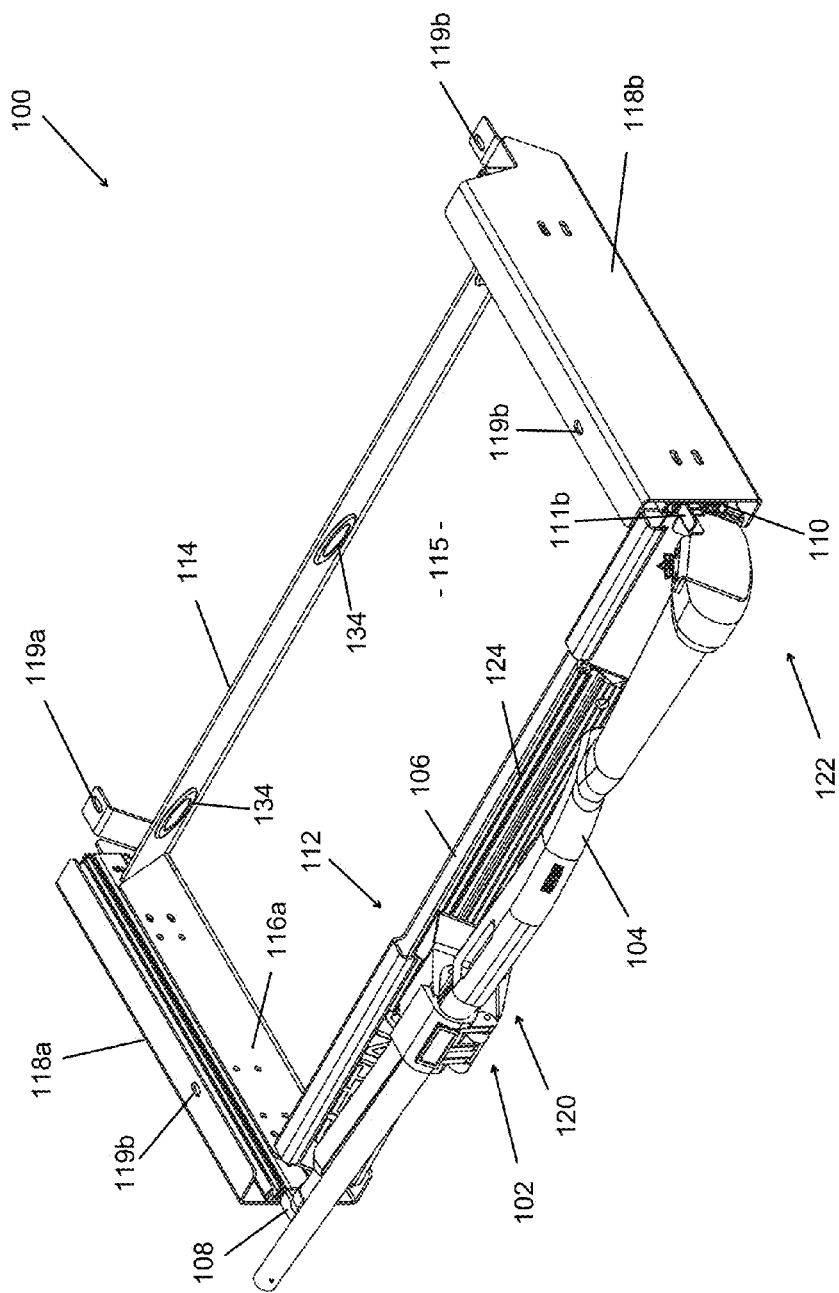
FIG. 1 is a perspective view of a firearm mount according to a first implementation in which a sliding portion of the mount is embodied as a trunk tray and showing a shotgun mounted in the mount.
Figure 2:
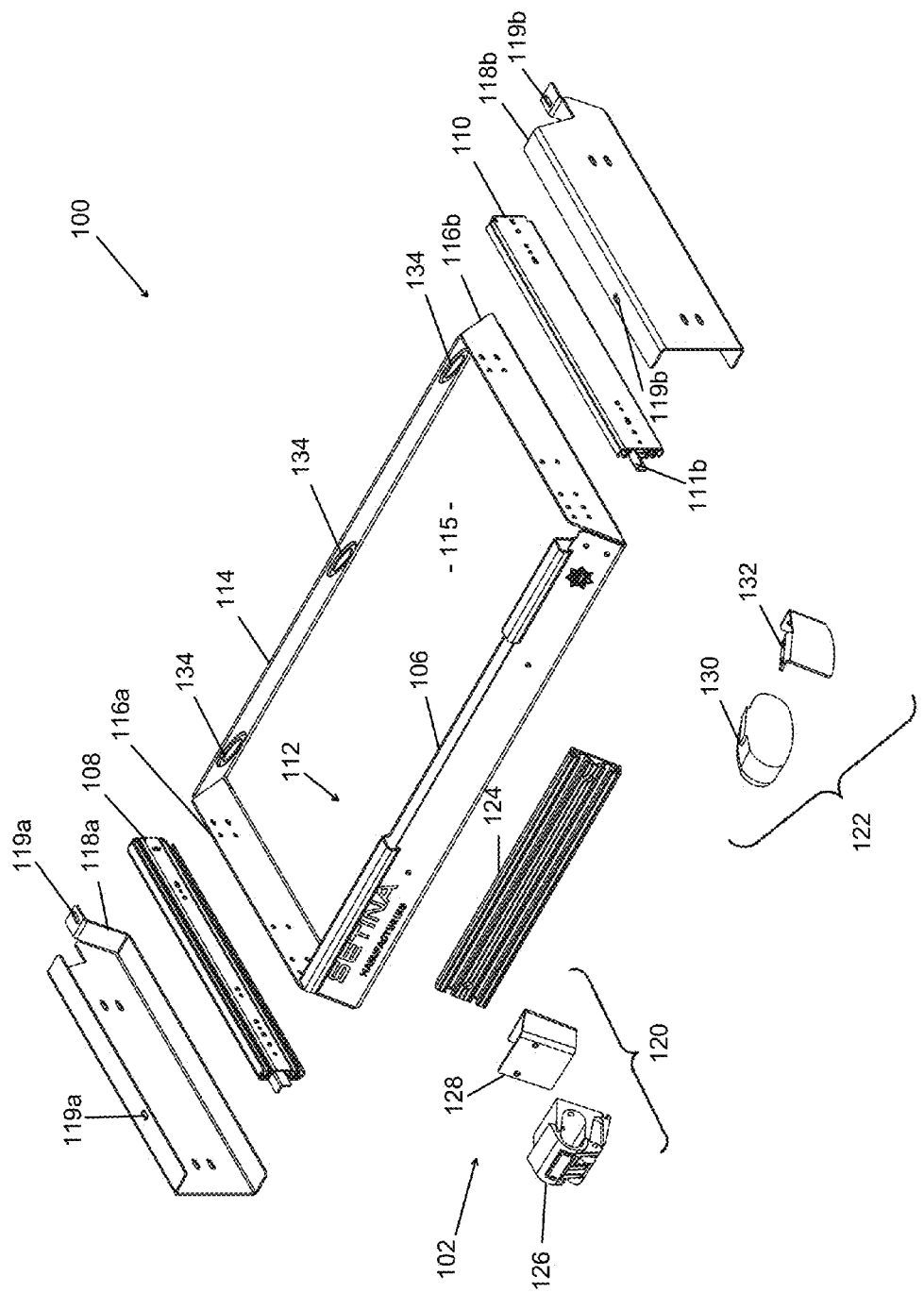
FIG. 2 is an exploded perspective view of the firearm mount of FIG. 1, except no firearm is shown.
Figure 3:
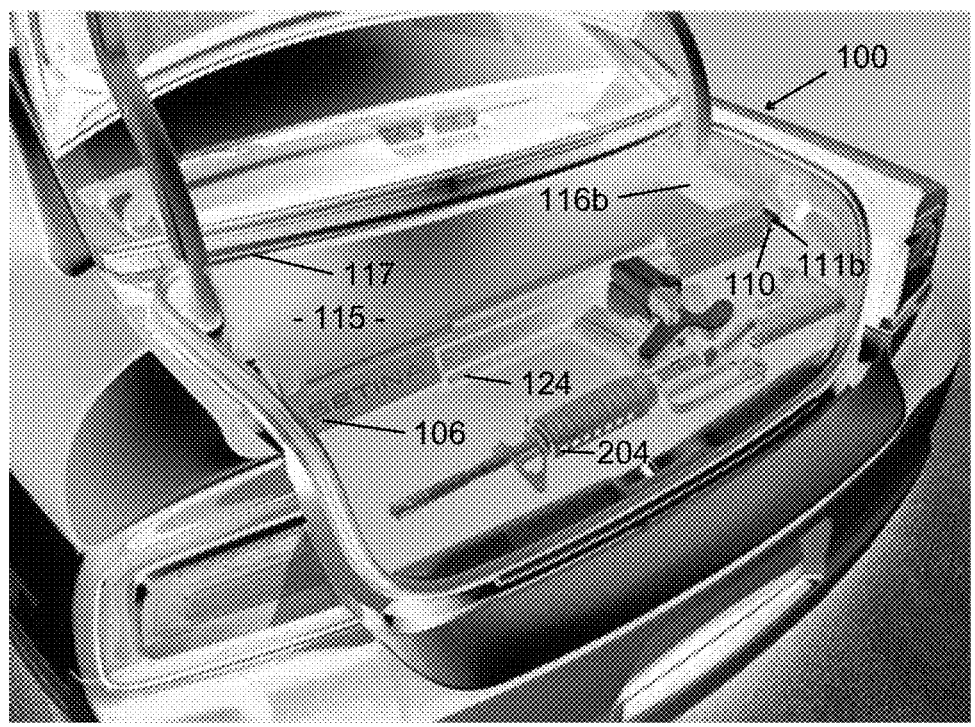
FIG. 3 is a perspective view of the firearm mount as installed in the open trunk of a police cruiser and shown in an extended position with a rifle secured in the mount.

Referring to FIGS. 1-3, a firearm mount 100 for a trunk or rear area of a vehicle is shown. FIG. 1 is a perspective view of the firearm mount 100 showing a firearm 104 mounted in a mount 102 that is connected to a support member 106. In FIG. 1, the firearm 104 is a shotgun, and in FIG. 3, the firearm 204 is a rifle.

FIG. 2 is an exploded view of the firearm mount 100 in which no firearm is shown for clarity. In FIGS. 1 and 2, the mount 100 is shown for clarity in isolation and without the surrounding structure of the vehicle trunk or cargo area to which the mount 100 is secured for use. FIG. 3 is a perspective view of the firearm mount 100 as installed in a trunk of a sedan.

As best seen in FIGS. 1 and 2, the support member 106 is moveable outwardly (defined as the direction towards the access opening of the trunk or cargo area), or inwardly in the opposite direction, to move the mount 102 holding the firearm 104, 204 from its storage position (shown in FIG. 1) to an extended or access position projecting further outwardly (shown in FIG. 3). This is particularly helpful with the deeper trunks of today's sedans. In general, the direction of movement is typically parallel with the longitudinal axis of the vehicle, and thus movement outwardly is in a rearward direction. In some cases, however, the outward direction of movement may not be aligned with the longitudinal direction of the vehicle, such as if the mount is mounted for access through a side opening of the vehicle instead of the trunk or rear cargo area.

In the illustrated implementations, the support member 106 can be slidably moveable between the storage and access positions. For example, ends of the member 106 can be connected to respective drawer slide assemblies 108, 110, which are in turn fixed to the vehicle, e.g., to a lower side of a rear deck 117 (FIG. 3) that separates the passenger compartment and trunk space. Other types of movement between positions can also be implemented.

Although not required, in the illustrated implementations, the support member 106 forms the outer side of a larger structure, e.g., a trunk tray 112 that provides for separated storage areas for various types of items within the trunk.

One or both of the drawer slide assemblies can be fitted with an optional lock element, e.g., a lock element 111a or 111b, if desired. The lock element can be configured to lock the member 106 in the storage position and/or in the access position.

In addition to the member 106, the trunk tray 112 has a bottom 115, left and right sides 116a, 116b, respectively, and an inner member 114. Left and right brackets 118a, 118b may be used to affix the draw slide assemblies 108, 110, respectively, to one or more surfaces of the vehicle trunk or cargo area. For example, the brackets 118a, 118b can have respective apertures 119a, 119b in upper horizontal surfaces to receive vertically oriented fasteners positioned to suspend the member 106 (and any other attached components) from an underside of the rear deck 117 of the vehicle. Attachment to other trunk surfaces is also possible.

In the illustrated implementations, no attachment to the bottom surface of the trunk is made, and the firearm 104, 204 is suspended within the trunk solely by contact between the mount 100 and points within the trunk at levels above the bottom surface. In other embodiments, e.g., with trays having a lesser width, it may be necessary to support one side of the mount 100 from the trunk bottom surface. The members 106 and 114 can be angled inwardly as shown to fit the geometry of the vehicle. In addition, as shown in FIG. 1, the angle of the member 106 makes the firearm more accessible upon opening of the trunk or cargo area.

In some implementations, the mount 102 includes only a single mount, such as a mount 120, e.g., as shown for the rifle 204 in FIG. 3. In other implementations, the mount 102 includes two mounts, in which case the mount 120 is a primary mount and there is also a secondary mount 122. The mount 120 can be dimensioned to receive the firearm at an intermediate area along its length, such as in the area of the forearm of the shotgun 104 or the receiver of the rifle 204. If provided, the secondary mount can be dimensioned to receive a portion of the firearm spaced from the intermediate portion. For example, the secondary mount 122 in the illustrated implementation is dimensioned to receive a butt of a stock for the shotgun 104. As best shown in FIG. 2, the mount 122 can include a butt mounting portion 130 and a bracket 132 that attaches to the member 106.

The mount 102 is movably mounted because the support member 106 to which the mount 102 is connected is movable, such as by sliding. The mount 102 in some implementations is also adjustable in a lateral direction, e.g., to accommodate the geometry of different firearms and/or trunk and cargo spaces. In the illustrated implementations, there is an adjustable mount member 124 mounted between the mount 102 and the member 106 when they are assembled together. The adjustable mount member 124 can have a channeled portion shaped to receive a corresponding portion of the mount 102, such as a portion of a bracket 106 attached to shotgun mount 126. In this way, the mount 102 can be quickly loosened and moved left or right to a new desired position before it is re-secured in place. In addition to being adjustable in translation, the mount 102 in some implementations can be rotated to a different position as desired. As shown in FIG. 1, the mount is positioned toward a left end of the adjustable mount member 124, whereas the mount is positioned towards the opposite right end in FIG. 3.

The mount 102 is lockable, usually with a built-in key lock or a padlock, to provide for secure storage of the firearm when the vehicle is unattended. An electronic locking mechanism can also be implemented. One suitable conventional mount is the Blac-Rac® mount Model 1070 (such as is shown in FIG. 3) and other similar models.

In implementations with the tray 112, the bottom 115 of the tray can be used to store equipment. Conventional trunk trays are used to store electronic and communications equipment. For convenience, the tray 112 can have one or more holes with grommets 134 for routing wires, cables and/or conduits, such as to a front area of the vehicle. In cases where temperatures and/or air flow are concerns, the trunk can be fitted with a 12V thermostat controlled fan unit, and the mount 100 can have a grille, such as in the bottom 115 to allow for air flow between the spaces below and above the tray, particularly when the trunk is closed.

Referring to FIG. 1, when in use as shown, the mounts 120 and 122 hold the firearm 104 securely, and the mount 120 is in a locked condition. The tray 112 is in a retracted or storage position as shown. When the need to access the firearm 104 arises, the trunk is unlocked/opened, either with a remote release button, a key or a keychain remote. The officer can then address the trunk and access the firearm 104. If time and conditions permit, the officer can grasp the member 106, unlock any optional lock element 111a and/or 111b that is present, and pull outward to move the firearm 104 and mount 120 closer so as to allow easier access. If conditions do not permit, then the firearm 104 can still be grasped and the mount 120 can be unlocked while the tray is still in the storage position. After the mount 120 is unlocked, it can be released or opened to allow the firearm to be removed from the mount 120 and the mount 122. The tray 112 can also be moved between the storage and access positions to provide access to items stored on the tray or to areas behind the tray.

The mount 100 can be fabricated from any suitable materials. For example, the major components of the tray 112 can be formed of 0.125-inch 5052 AL or other similar materials. In some embodiments, the bottom 115 of the tray has dimensions of about 36 inches wide by about 18 inches deep, and the sides are about 3 inches high. The assemblies 116a, 116b can be high capacity (300 lbs.) lock in/lock out drawer slides with 18 inches of travel. The brackets 118a, 118b and/or the slides 116a, 116b can provide for multiple levels of height adjustment, such as three levels in 1-inch increments. The various components can be secured together by conventional fasteners, e.g., screws or bolts. For some vehicles, no drilling of holes is required because components mounted to the vehicle make use of existing holes.

In view of the many possible embodiments to which the disclosed principles may be applied, it should be recognized that the illustrated embodiments are only preferred examples and should not be taken as limiting the scope of protection. Rather, the scope of protection is defined by the following claims. I therefore claim all that comes within the scope and spirit of these claims.

I claim:

1. A firearm mount for a trunk or cargo space of a vehicle, comprising:
    a slideable tray defining a storage area, the tray having first and second opposing sides and at least one outer side extending between the first and second sides, the outer side being configured for positioning adjacent an opening of the trunk or cargo space;
    first and second drawer slide assemblies coupled to the first and second sides of the tray and configured for attachment within the trunk or cargo space to support the tray for access, wherein the tray is slideably movable on the first and second drawer slide assemblies between a distal access position and a proximal storage position;
    at least one firearm mounting member coupled to the outer side of the tray, the firearm mounting member being adjustably coupled to a track connected to the tray and extending parallel to the outer side, the firearm mounting member being shaped to receive a firearm in its upright orientation and lockable to secure the firearm in the firearm mount, wherein the tray and the firearm mounting member are sized and spaced relative to each other to permit the opening of the trunk or cargo space to be closed when the tray is retracted into the proximal storage position and to maintain a gripping space between the tray and a firearm received in the firearm mount to allow a user to access the firearm when the tray is in the access position.

2. The firearm mount of claim 1, wherein the track comprises a T-rail section defining a channel.

3. The firearm mount of claim 1, further comprising a lock release positioned adjacent the outer side of the tray and actuatable to allow the tray to be moved from the storage position to the access position.

4. The firearm mount of claim 1, further comprising an inner side opposite the outer side, and wherein the inner side has at least one opening configured for routing wires or cables extending to electrical components positioned in the storage area of the tray.

5. The firearm mount of claim 1, wherein the tray comprises an electrically powered fan unit for helping maintain the trunk or cargo space at a desired temperature.

6. The firearm mount of claim 1, wherein the at least one firearm mounting member is a first mounting member, further comprising at least a second mounting member coupled to the track and laterally spaced apart from the first mounting member.

7. The firearm mount of claim 6, wherein the first mounting member is shaped to receive an intermediate portion of a rifle or shotgun and the second mounting member is shaped to receive a butt of the rifle or shotgun.

8. The firearm mount of claim 6, wherein the firearm mounting member comprises an end shaped to be received in the channel.

9. The firearm mount of claim 1, further comprising respective brackets for mounting the drawer slide assemblies in the trunk or cargo space.

10. The firearm mount of claim 9, wherein the tray, brackets and drawer slide assemblies do not contact a bottom surface of the trunk or cargo area.

11. The firearm mount of claim 9, wherein the brackets are configured for coupling to an underside of a rear deck of the vehicle.

* * * * *